US005781757A

United States Patent [19]
Deshpande

[11] Patent Number: 5,781,757
[45] Date of Patent: Jul. 14, 1998

[54] ADAPTIVE SCALABLE CACHE COHERENCE NETWORK FOR A MULTIPROCESSOR DATA PROCESSING SYSTEM

[75] Inventor: Sanjay Raghunath Deshpande, Austin, Tex.

[73] Assignee: International Business Machines Corporation, Armonk, N.Y.

[21] Appl. No.: 747,587

[22] Filed: Nov. 13, 1996

Related U.S. Application Data

[63] Continuation of Ser. No. 320,484, Oct. 11, 1994, abandoned.

[51] Int. Cl.$^6$ ..................................................... G06F 13/00
[52] U.S. Cl. ............... 395/473; 395/200.02; 395/200.03; 395/200.1; 395/200.16; 395/200.15; 395/200.21; 395/297; 395/300; 395/446; 395/447; 395/448; 395/468; 395/449; 395/471; 395/472; 395/473; 395/730; 395/731; 395/800
[58] Field of Search .......................... 395/447, 446, 395/448, 468, 449, 473, 472, 471, 200.16, 297, 200.21, 200.15, 300, 730, 731, 200.02, 200.03, 200.1, 800

[56] References Cited

U.S. PATENT DOCUMENTS

| | | | |
|---|---|---|---|
| 4,049,974 | 9/1977 | Boone et al. | 326/95 |
| 4,367,420 | 1/1983 | Foss et al. | 326/119 |
| 4,570,084 | 2/1986 | Griffin et al. | 326/98 |
| 4,755,930 | 7/1988 | Wilson, Jr. et al. | 395/449 |
| 4,794,342 | 12/1988 | Kimura | 330/2 |
| 4,896,057 | 1/1990 | Yang et al. | 326/116 |
| 4,907,184 | 3/1990 | Nakano et al. | 369/736 |
| 5,025,365 | 6/1991 | Mathur et al. | 395/448 |
| 5,030,857 | 7/1991 | Sanwo et al. | 326/86 |
| 5,250,860 | 10/1993 | Chu et al. | 326/60 |
| 5,265,235 | 11/1993 | Sindhu et al. | 395/447 |
| 5,274,782 | 12/1993 | Chalasani et al. | 395/325 |
| 5,313,609 | 5/1994 | Baylor et al. | 395/448 |
| 5,345,578 | 9/1994 | Manasse | 395/473 |
| 5,440,698 | 8/1995 | Sindhu et al. | 395/200.08 |
| 5,530,646 | 6/1996 | Schoen | 364/421 |

OTHER PUBLICATIONS

Lipovski, G. J., *An Organization for Optical Linkages Between Integrated Circuits*, National Computer Conference, 1977, pp. 227–236.

Dae–Wha Seo, et al, *Directory–Based Cache Coherence Scheme Using Number–Balanced Binary Tree*, Microprocess. Microprogr. (Netherlands), vol. 37, No. 1–5, pp. 37–40, Jan. 1993, 4 REF.

(List continued on next page.)

*Primary Examiner*—Tod R. Swann
*Assistant Examiner*—Denise Tran
*Attorney, Agent, or Firm*—Richard A. Henkler; Brian F. Russell; Andrew J. Dillon

[57] ABSTRACT

A cache coherence network for transferring coherence messages between processor caches in a multiprocessor data processing system is provided. The network includes a plurality of processor caches associated with a plurality of processors, and a binary logic tree circuit which can separately adapt each branch of the tree from a broadcast configuration during low levels of coherence traffic to a ring configuration during high levels of coherence traffic. A cache snoop-in input receives coherence messages and a snoop-out output outputs, at the most, one coherence message per current cycle of the network timing. A forward signal on a forward output indicates that the associated cache is outputting a message on snoop-out during the current cycle. A cache outputs received messages in a queue on the snoop-out output, after determining any response message based on the received message. The binary logic tree circuit has a plurality of binary nodes connected in a binary tree structure. Each branch node has a snoop-in, a snoop-out, and a forward connected to each of a next higher level node and two lower level nodes. A forward signal on a forward output indicates that the associated node is outputting a message on snoop-out to the higher node during the current cycle. Each branch ends with multiple connections to a cache at the cache's snoop-in input, snoop-out output, and forward output.

7 Claims, 11 Drawing Sheets

OTHER PUBLICATIONS

Farrens, M., et al., CCHIME: *A Cache Coherent Hybrid Interconnected Memory Extension*, Proceedings: Sixth International Parallel Processing Symposium, (Cat. No. 92TH0419-2), IEEE Computer Soc. Press, xviii+693 pp., pp. 573-577, 1992, 11 REF.

Gupta, S., et al., *Stanford DASH Multiprocessor: The Hardware and Software Approach*, Proceedings: 4th International Parallel Architectures and Languages Europe Conference, 1992, Springer-Verlag, xvii+894 pp., pp. 802-805, 1992 40 REF.

Michael, W., *Directory-Based Coherency Protocol For a Ring-Connected Multiprocessor-Array*, Comput. Archit. News (USA), vol. 20, No. 2, p. 437, May 1992, 0 REF.

Al-Sadoun, H.B., et al., *Cache Coherency In Multiple Bus Systems*, Int. J. Electron (UK), vol. 73, No. 3, pp. 497-522, Sept. 1992, 33 REF.

Tamir, Y., et al., *Hierarchical Coherency Management For Shared Virtual Memory Multicomputers*, J. Parallel Distribut. Comput. (USA), vol. 15, No. 4, pp. 408-419, Aug. 1992, 17 REF.

Thapar, M., et al., *Scalable Cache Coherence For Shared Memory Multiprocessors*, Proceedings: Parallel Computation, First International ACPC Conference, Springer-Verlag, ix+451 pp., pp. 1-12, 1992, 13 REF.

Dahlgren, F., et al., *Reducing Write Latencies For Shared Data In A Multiprocessor With A Multistage Network*, Proceedings of the Twenty-Fifth Hawaii International Conference on System Sciences (Cat. No. 91TH0394-7), IEEE Comput. Soc. Press, 4 vol., (xv+831+877+xii+670+xiii+729) pp., pp. 449-456, vol. 1, 1991, 14 REF.

Tiruveedhula, V., et al., *Performance Analysis Of A Cache--Based Multiprocessor System Using Data Movement Policies*, Microprocess. Microprogr., (Netherlands), vol. 33, No. 4, pp. 237-248, Jun. 1992, 7 REF.

Marquardt, D.E., et al., *A Cache-Coherent, Distributed Memory Multiprocessor System and Its Performance Analysis*, IEICE Trans. Inf. Syst. (Japan), vol. E75-D, No. 3, pp. 274-290, May 1992, 34 REF.

Yang, Q., et al., *Design Of An Adaptive Cache Coherence Protocol For Large Scale Multiprocessors*, IEEE Trans. Parallel Distrib Syst. (USA), vol. 3, No. 3, pp. 281-293, May 1992, 27 REF.

Yang, Q., et al., *An Adaptive Cache Coherence Scheme For Hierarchical Shared-Memory Multiprocessors*, Proceedings of the Second IEEE Symposium on Parallel and Distributed Processing 1990 (Cat. No. TH0328-5), IEEE Comput. Soc. Press, xix+892 pp. 318-325, 1990, 22 REF.

Mori, S., et al., *The Kyushu University Reconfigurable Parallel Processor-Cache Architecture and Cache Coherence Schemes*, Proceedings of the International Symposium on Shared Memory Multiprocessing, Inf. Process. Soc. Japan, 251 pp., pp. 218-219, 1991, 23 REF.

Thapar, M. et al., *Cache Coherence For Large Scale Shared Memory Multiprocessors*, Comput. Archit. News (USA), vol. 19, No. 1, pp. 114-119, March 1991, 12 REF.

Thaper, M., et al., *Scalable Cache Coherence for Large Shared Memory Multiprocessors*, Proceedings: 1990 Joint International Conference on Vector and Parallel Processing, Springer-Verlag, xi+900 pp., pp. 592-603, 1990, 19 REF.

Lenoski, D., et al., *Design of Scalable Shared-Memory Multiprocessors: The DASH Approach*, COMPCON Spring '90, Thirty-Fifth IEEE Computer Society International Conference, Intellectual Leverage, Digest of Papers, (Cat. No. 90CH2843-1), IEEE Comput Soc., xvi+644 pp., pp. 62-67, 1990, 11 REF.

Yang, Q., et al., *Performance Analysis Of A Cache-Coherent Multiprocessor Based On Hierarchical Multiple Buses*, Proceedings of the International Conference on Databases, Parallel Architectures and Their Applications, 1990, (Cat. No. 90CH2728-4), IEEE Comput. Soc. Press, xiv+570 pp., pp. 248-257, 1990, 24 REF.

Marquardt, D.E., et al., *C/Sup 2/MP: A Cache-Coherent, Distributed Memory Multiprocessor-System*, Proceedings of Supercomputing '89, ACM, xviii+894 pp., pp. 466-475, 1989, 39 REF.

Bhuyan, L.N. et al., *Analysis of MIN Based Multiprocessors With Private Cache Memories*, Proceedings of the 1989 International Conference on Parallel Processing, (Cat. No. 89CH2701-1), Pennsylvania State Univ. Press, 3 vol., (xv+137+xiii+263+xiii+262) pp., pp. 51-58 vol. 1, 1989, 20 REF.

Owicki, S., et al., *Evaluating The Performance Of Software Cache Coherence*, ASPLOS-III Proceedings. Third International Conference on Architectural Support For Programming Languages and Operating Systems, ACM x+303pp., pp. 230-242, 1989, 33 REF.

Winsor, D.C., et al., *Analysis Of Bus Hierarchies For Multiprocessors* 15th Annual International Symposium on Computer Architecture, Conference Proceedings (Cat. No. 88CH2545-2), IEEE Comput. Soc. Press, xi+461 pp., pp. 100-107, 1988, 20 REF.

Bhuyan, L.N., et al., *Multistage Bus Network (MBN) An Interconnection Network For Cache Coherent Multiprocessors*, Proceedings of the Third IEEE Symposium on Parallel and Distributed Processing (Cat. No. 91TH0396-2), IEEE Comput. Soc. Press, xvi+903 pp., pp. 780-787, 1991, 14 REF.

Ganapathy, K.N., et al., *Yield Optimization In Large RAM's With Hierarchical Redundancy*, Special Brief Papers, *IEEE Journal of Solid-State Circuits*, vol. 26, No. 9, Sep. 1991.

Deshpande, Sanjay, et al., *Scalability Of A Binary Tree On A Hypercube*, Department of Electrical and Computer Engineering, University of Texas at Austin, 1986.

ADAPTIVE SCALABLE CACHE COHERENCE NETWORK FOR A MULTIPROCESSOR DATA PROCESSING SYSTEM

This is a continuation of application Ser. No. 08/320,484, filed 11 Oct. 1994 now abandoned.

BACKGROUND OF THE INVENTION

1. Technical Field

The present invention relates in general to a cache coherence network in a data processing system, and more particularly to a cache coherence network in a data process system which is adaptable and scalable.

2. Description of the Related Art

A cache coherence network connects a plurality of caches to provide the transmission of coherence messages between the caches, which allows the caches to maintain memory coherence. A snoopy cache coherence mechanism is widely used and well understood as used in multiprocessor systems. Snoopy cache coherence in multiprocessor systems use a single bus as a data transmission media. The single bus allows messages and data to be broadcast to all caches on the bus at the same time. A cache monitors (snoops on) the bus and automatically invalidates data it holds when the address of a write operation seen on the bus matches the address the cache holds.

A single bus cache coherence network becomes impractical in medium-to-large multiprocessor systems. As the number of processors in the system increases, a significant load is placed on the bus to drive the larger capacity, and the volume of traffic on the bus is substantially increased. Consequently, cycle time of the snoopy bus scales linearly with the number of caches attached to the bus. At some point, the cycle time of the snoopy bus will become larger than the cycle time of the processors themselves, resulting in a saturation of the bus. Combining this with the fixed throughput of one coherence message per cycle of the bus, the bus quickly saturates as the number of caches attached to the bus increases. Thus, there is a limit to the number of caches that can be maintained effectively on a single snoopy bus. What is needed is an interconnection network that can adapt under the heavy electrical loading and increased traffic conditions that may result in a large multiprocessor system, thus, providing scalability to the system. It would be further desirable to provide an interconnection network that acts logically like, and affords a broadcast capability like, the snoopy bus.

SUMMARY OF THE INVENTION

It is therefore one object of the present invention to provide an adaptable cache coherence network in a data processing system.

It is another object of the present invention to provide an adaptive scalable cache coherence network in a data processing system.

It is still another object of the present invention to provide an adaptive, scalable cache coherence network in a data processing system which acts like a snoopy bus.

It is another object of the present invention to provide a cache coherence network in a data processing system which provides broadcast capability.

The foregoing objects are achieved as is now described. According to the present invention, a cache coherence network for transferring coherence messages between processor caches in a multiprocessor data processing system is provided. The network includes a plurality of processor caches associated with a plurality of processors, and a binary logic tree circuit which can separately adapt each branch of the tree from a broadcast configuration during low levels of coherence traffic to a ring configuration during high levels of coherence traffic.

Each cache has a snoop-in input, a snoop-out output, and a forward output, wherein the snoop-in input receives coherence messages and the snoop-out output outputs, at the most, one coherence message per current cycle of the network timing. A forward signal on a forward output indicates that the associated cache is outputting a message on the snoop-out during the current cycle. A cache generates coherence messages according to a coherency protocol, and, further, each cache stores messages received on the snoop-in input in a message queue and outputs messages loaded in the queue on the snoop-out output, after determining any response message based on the received message.

The binary logic tree circuit has a plurality of binary nodes connected in a binary tree structure, starting at a top root node and having multiple branches formed of branch nodes positioned at multiple levels of a branch. Each branch node has a snoop-in, a snoop-out, and a forward output connected to each of a next higher level node and two lower level nodes, such that a branch node is connected to a higher node at a next higher level of the tree structure, and to a first lower node and second lower node at a next lower level of the tree structure. A forward signal on a forward output indicates that the associated node is outputting a message on snoop-out to the higher node during the current cycle. Each branch ends with multiple connections to a cache at the cache's snoop-in input, snoop-out output, and forward output, wherein the cache forms a bottom level node.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
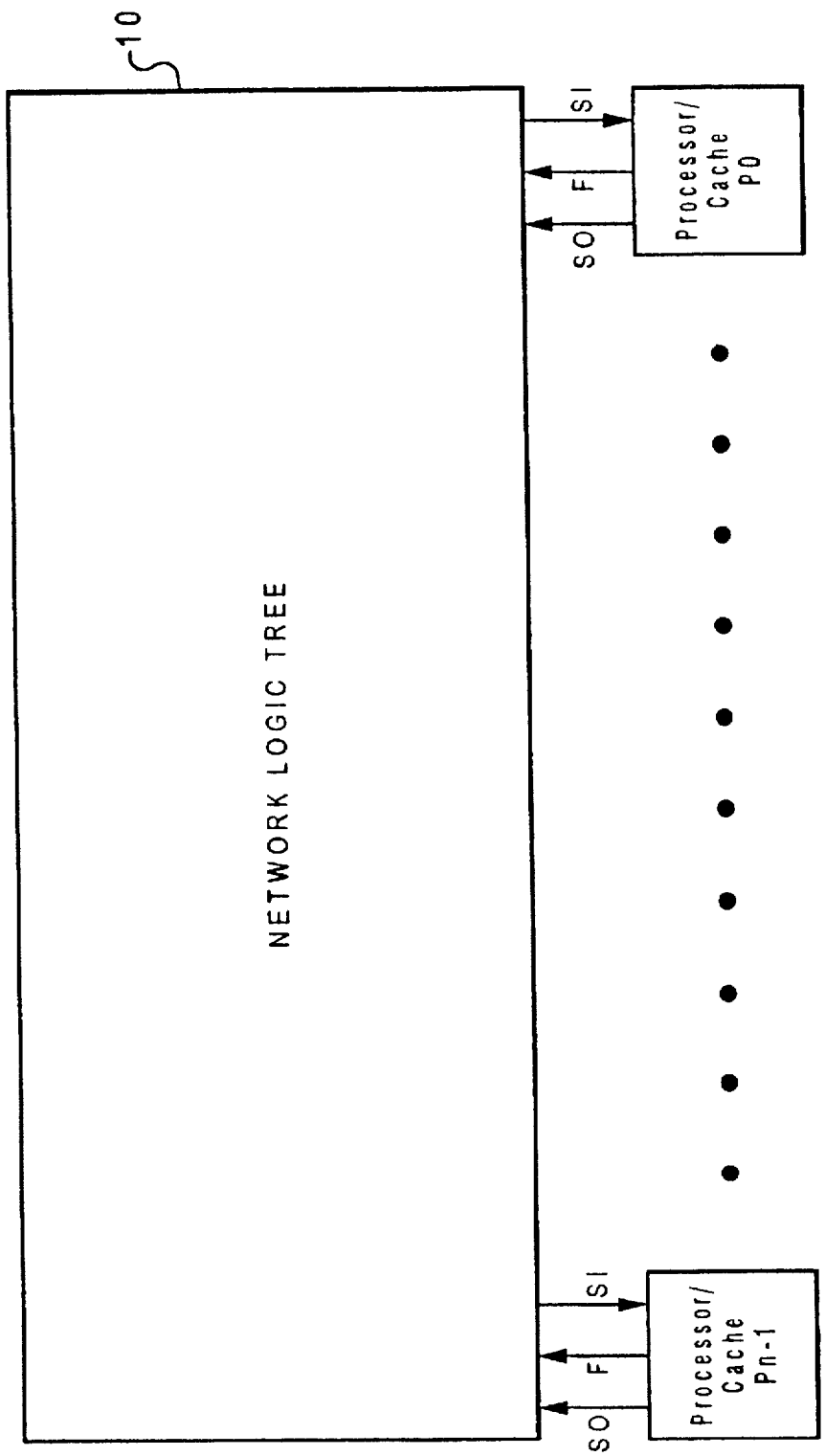
FIG. 1 depicts a block diagram of the cache coherence network of the present invention.

With reference now to the figures and in particular with reference to FIG. 1, there is depicted a block diagram of the cache coherence network of the present invention. Network logic tree 10 is connected to a plurality of processor/caches $P_0$-$P_{n-1}$. Each processor/cache $P_j$ ($P_{n-1} \geq P_j \geq P_0$) represents a processor with an associated cache, although the physical implementation may not have the cache integral to the processor as shown by the blocks in FIG. 1. The processor caches are also connected through a separate data communications bus (not shown) for transferring data blocks of memory between the processors and the system's main memory.

As seen in FIG. 1, each processor Po-Pn-1 has three connections to the network: snoop-out (SO), Forward (F), snoop-in (SI). The F signal output from a processor is a single bit signal. The SO and SI signals are multi-bit signals carried over a multi-bit bus. The information flowing over the network from the SO and SI ports is referred to as coherence traffic and can be divided into two categories: coherence requests and coherence responses. The requests and responses are in the form of packetized messages which travel in the network as a single uninterrupted unit. Coherence requests are initiated by a cache in response to a main memory access by its processor. A coherence response typically is initiated by other caches responding to requests which they have received on their SI inputs. An example of a coherence request would be a message asking a cache to invalidate a block of data. For example, <tag id> DCache-block-flush. An example of a coherence response would be an acknowledge message indicating the datablock has been invalidated in the cache. For example, Ack, <tag id>. The coherence messages used in the cache coherence network of the present invention could take on many forms, including those well known and often used in current snoopy coherency schemes.

The SO output is used for outputting a number of messages onto the network. The network is timed, so that a cache may output only one message during each cycle of the network timing. The cache may issue a new coherence request, or it may respond to a coherence request by generating a response, or it may simply pass on a request that it had received earlier over its SI port. When a cache uses its SO port to output a coherence message, it requests participation in the coherence traffic over the network by negating its F signal. When a cache is not requesting participation in the coherence traffic, it always asserts its F signal and outputs a negated signal on the SO port (i.e., SO=0).

A cache always receives coherence requests or responses from other caches on its SI input. A cache deletes a request it receives from the coherence traffic on the SI port, if it is one it had sent out earlier over the SO port to be issued to the other processors in the network. Suitable identification fields are placed within each coherence message when it is sent out from an SO port, thus enabling a receiving cache to identify the originating cache of the message. In this way, a cache is able to identify its own messages which it had sent out over the network at a previous cycle, and to delete the message. This message will be deleted regardless of whether the F signal is asserted at the time of receipt.

A cache maintains a queue of incoming requests on its SI port. This queue (not shown) is necessary because over a given period of time the cache may be generating its own coherence messages faster than it can evaluate and/or rebroadcast the received messages. The cache will delete a message from the SI queue if the message's identification field shows it to be a message originating from that cache.

In any cache coherence protocol which might be used with the preferred embodiment, the cache generates a response message if a received message is relevant to its own contents and warrants a response. In addition, the cache may either forward a received request out onto the network over its SO port, or ignore it.

Figure 2:
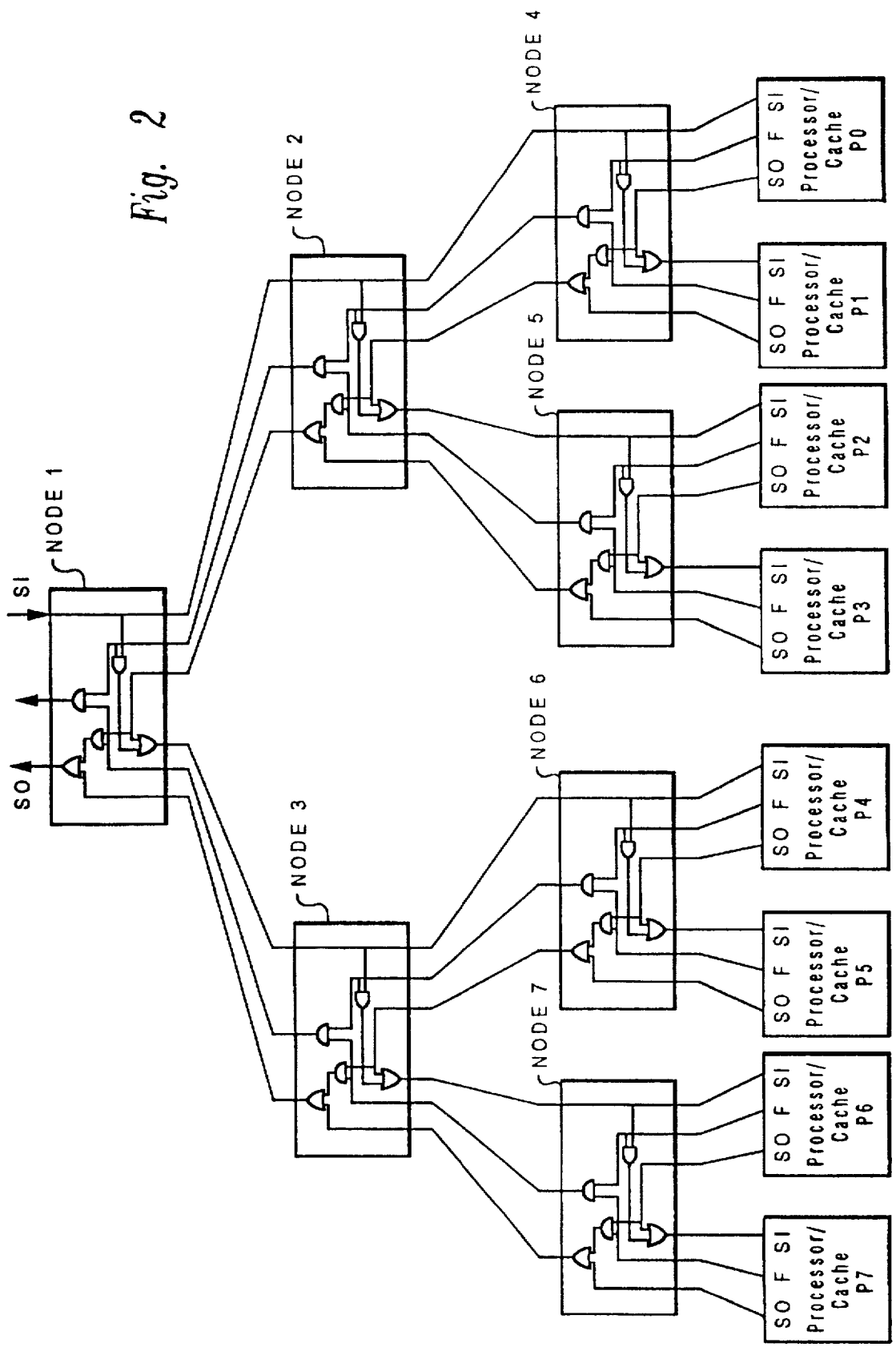
FIG. 2 shows a schematic diagram of a preferred embodiment of the cache coherence network of the present invention.

In accordance with the present invention, if the cache had asserted the F signal when it received a particular coherence request, the next processor in the network must also have received that request (as explained below). In that case, there is no need for the cache to forward the message to the next cache in the network. If the cache had negated the F signal at the time it received the coherence request, and therefore had itself sourced a valid coherence message to its SO port simultaneously, the cache had clipped the broadcast mechanism (as explained below) and must forward the received coherence request to the next cache in the network. What constitutes the "next" cache in the network may be logically different than the physical makeup of the computer system. The "next" cache or processor is deciphered from the logic of the network logic tree 10, which is made up of the network nodes. In the preferred embodiment as shown in FIG. 2, it will be shown that, because of the logic circuitry, a "next" processor is the processor to the left of a given processor, and is labelled with a higher reference number (i.e. P1>P0). But because of the network connection at the root node of the tree, P0 is the "next" processor after processor P7.

Along with saving the incoming message in the SI queue, the receiving cache saves the current state of the F signal at the time it receives the queued message. Preferably, the F signal is saved with the message in the SI queue. To determine whether to forward a received message out onto the network, the cache will check the state of the F signal at the time that the coherence message was received, which was stored in the message queue at the same time as the message.

Referring now to FIG. 2, there is depicted a preferred embodiment of an adaptable, scalable binary tree cache coherence network in a multiprocessor data processing system, according to the present invention. The network is comprised of eight processors and their associated caches, P0–P7, and the network nodes, NODE1–7. Together they form a network by which the processors P0–P7 can efficiently pass coherence messages to maintain coherent memory within their caches.

This network is able to adapt to varying volumes and kinds of coherence messages being transmitted over the network. The binary tree structure of the transmission network has a cycle time which scales to the logarithm of the number of caches (i.e., processors) connected to the network. This enables the network of the present invention to be scalable to medium-sized to large-sized multiprocessor systems. When there is light traffic on the network, processors are able to broadcast coherence messages to other processors, providing quick and efficient cache coherence mechanism. As coherence traffic increases, the network is able to adapt and pass messages in a ring-like manner to the next processor in the network. In that configuration, the network bandwidth is increased by allowing pipelining of coherence traffic. In fact, the throughput of coherent messages through the network can be as high as the number of caches in the network. Also, the ring connections substantially reduce driving requirements. Moreover, the network is also able to adapt to varying degrees of increased traffic by segmenting itself into broadcast sections and ring sections, depending on the locality of increased traffic.

The network logic tree 10 (in FIG. 1) is comprised of a plurality of network nodes connected together in a binary logic tree structure, and each of the processors of the multiprocessor system are connected at the leaves of the binary logic tree. In the preferred embodiment of FIG. 2, the network logic tree comprises root node NODE1 at the top level of the tree and branch nodes NODE2–7 formed along branches at lower levels of the tree.

Figure 3:
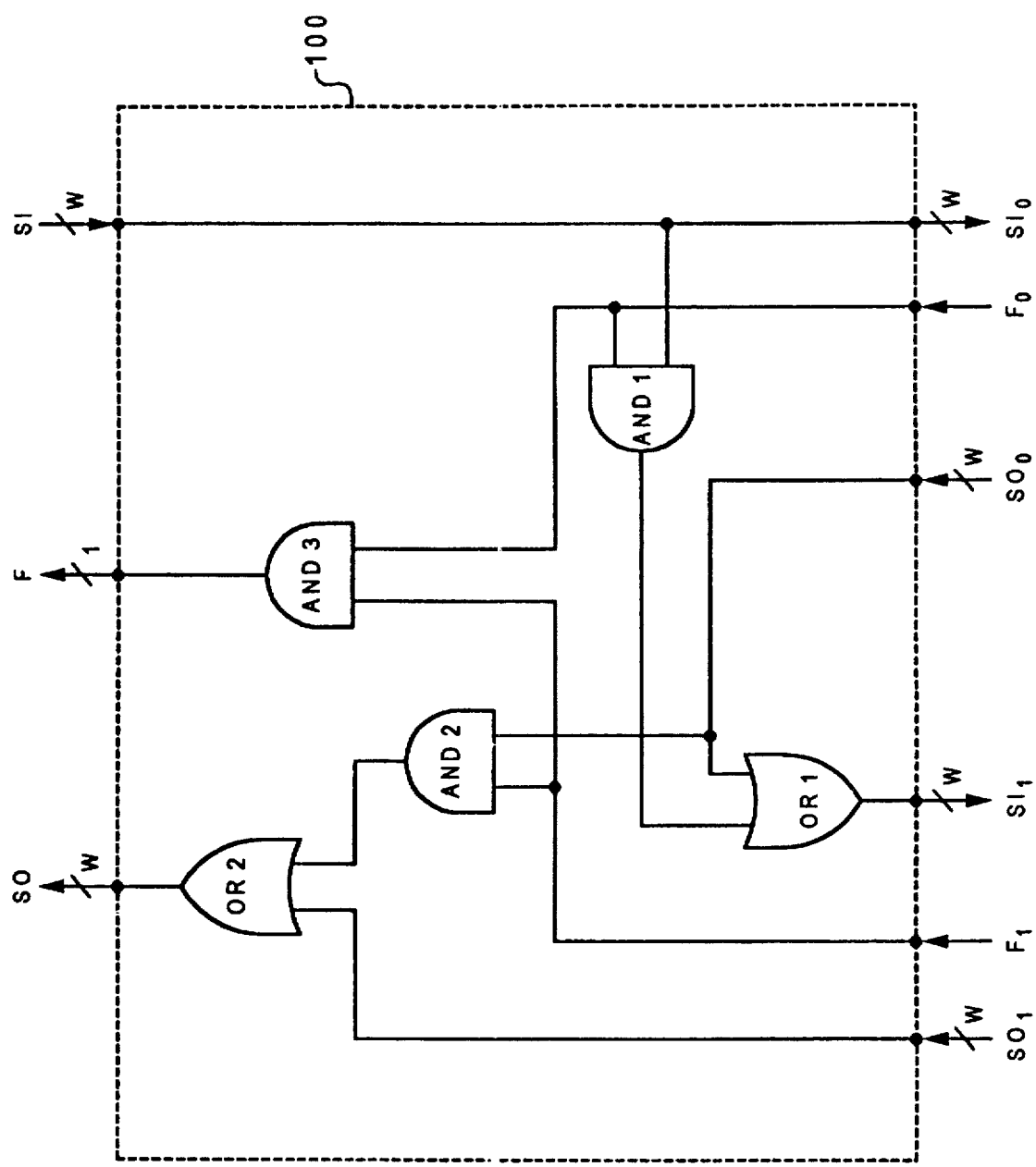
FIG. 3 shows a schematic diagram of the logic circuit of a preferred embodiment of a network node.

Each network node NODE1–7 is designed with an identical logic circuit, that which is depicted in FIG. 3, according to a preferred embodiment of the present invention. This circuit is the same circuit used in carry look-ahead adder circuits. Therefore, the operation of this circuit is well understood and well known by those skilled in the art. The organization and operation of a binary logic tree using the carry look-ahead circuit as the universal link has been described in the prior art. See, G. J. Lipovski, "An Organization For Optical Linkages Between Integrated Circuits", NCC 1977, which is incorporated herein by reference. This paper describes the use of a Carry Look-ahead circuit in a binary logic tree to configure a broadcast or propagating link optical communication network.

Network node 100 has three connections to a higher level node in the tree: SO, F, and SI; and six connections to two lower level nodes in the tree: $SO_0$, $F_0$, and $SI_0$ connected to a first lower level node, and $SO_1$, $F_1$, and $SI_1$ connected to a second lower level node. Each SO and SI port is labelled with a w to indicate that the port accommodates w-bit-wide signals. Each of the F ports accommodates a 1-bit-wide signal.

The SI port has an arrow pointing into the node 100 to show that the node receives messages from the higher level node on that port. The SO and F ports have arrows pointing away from the node showing that these are output signals from the node to a higher level node in the binary tree. Similarly, the $SI_0$ and $SI_1$ have arrows pointing away from node 100 showing that they are outputs from node 100 and inputs (snoop-in) into their respective lower level nodes. Ports $F_0$, $SO_0$, $F_1$, and $SO_1$ are shown with arrows pointing into node 100 to indicate that they are outputs from the lower level nodes and inputs into node 100.

The circuit of FIG. 3 is combinational, and has no registers within it. The logic of the tree works as stipulated when all signals are valid and stable. However, the processors and caches which use the tree are independently clocked circuits. In some system designs, it may therefore be necessary to provide queues at the ports of the tree and design an appropriate handshaking mechanism for communication between a cache and its tree ports. The tree is clocked independently and works on the entries in front of the SO and F queues at its leaf ends. (In fact, a separate F queue is not necessary, if an empty SO queue implies an asserted F signal.) The tree forwards the data to caches over the SI ports. Additionally, if delays through the tree are not acceptable (for the required cycle time of the tree), the tree can be pipelined by adding registers at appropriate levels of the tree.

Figure 11:
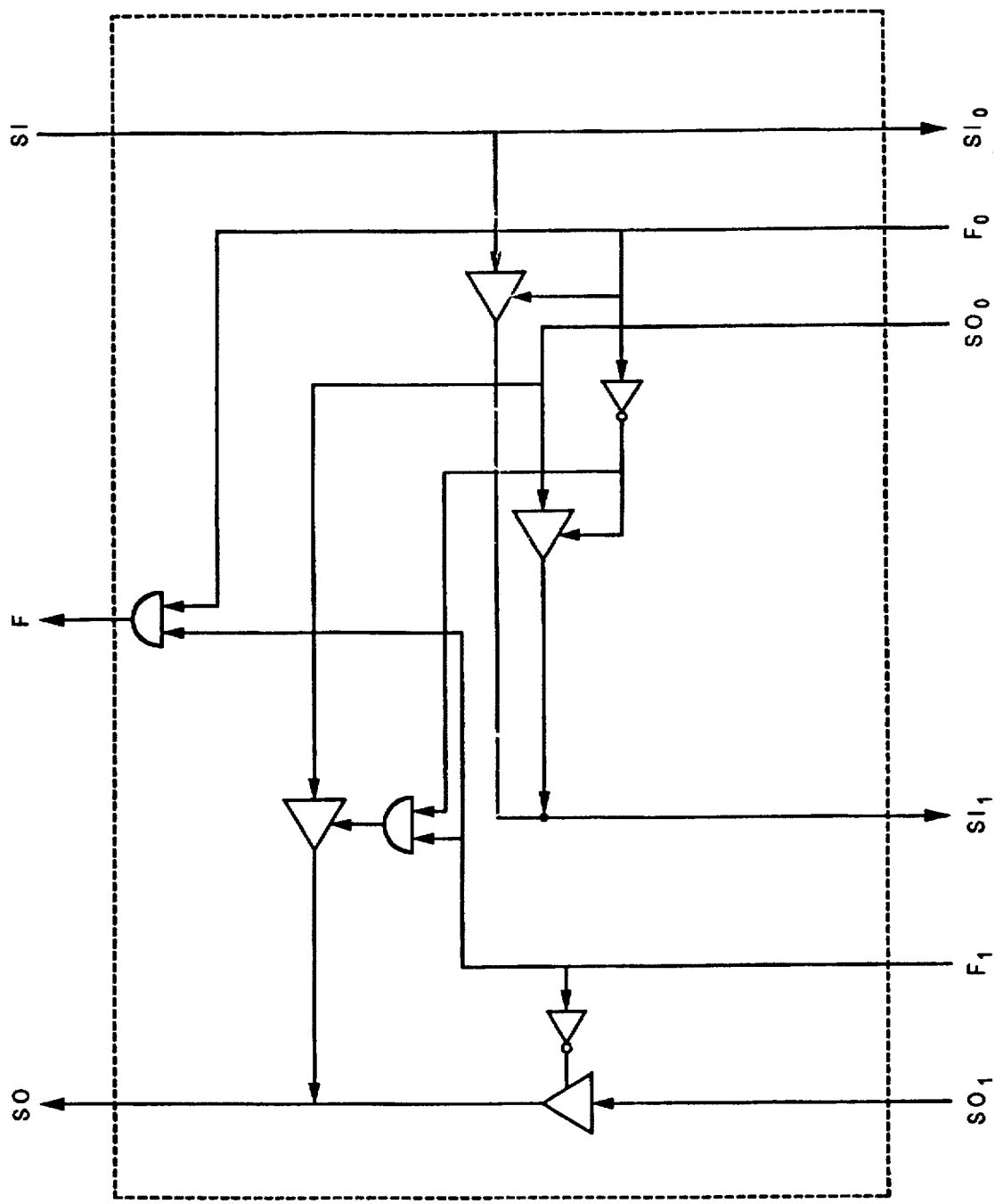
FIG. 11 shows a schematic diagram of a logic circuit of a preferred embodiment of a network node.

It should be noted that although the circuit of FIG. 3 simply and efficiently provides the transmission connections required for the present invention, it will be appreciated by those skilled in the art that other circuit configurations which provide the same input and output connections to provide the same logical function could also be used in the present invention. For example, FIG. 11 is a schematic diagram of a logic circuit which may be used as a network node in an alternative embodiment of the present invention. Also, the logic of the forward signals or the snoop-in/snoop-out signals could be inverted and the binary logic tree circuitry designed to operate on these inverted signals as will be appreciated by those skilled in the art.

The operation of the circuit in FIG. 3 is predicated on the states of the forward signals $F_0$ and $F_1$. Therefore, there are four possible configurations under which the logic circuit operates. These four configurations are shown in FIGS. 4–7.

Figure 4:
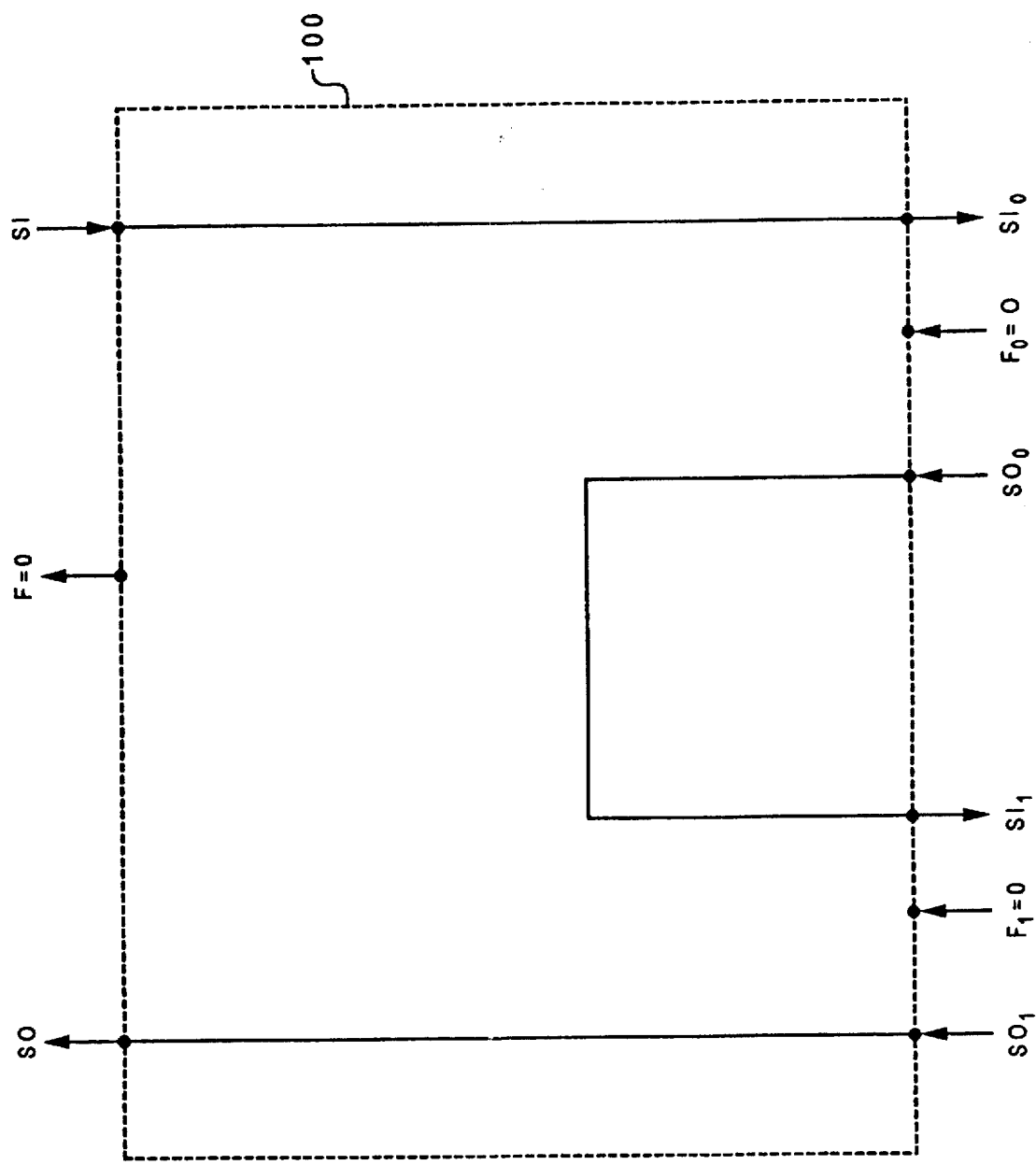
FIGS. 4–7 are the four possible port connection configurations of the logic circuit of FIG. 3, as it is used in the preferred embodiment of the present invention of FIG. 2.

FIG. 4 diagrams the connections between ports in node 100, when both forward signals from the lower level nodes are not asserted (i.e. $F_0=F_1=0$). Because both nodes have negated their forward signals, the lower level nodes will be outputting coherence messages over their SO ports. $SO_0$ will be transmitted to $SI_1$ through logical OR-gate OR1. The negated forward signals with turn off AND-gates AND1, AND2 and AND3. This allows $SO_1$ to pass through OR2 to SO. SI is directly connected to $SI_0$.

Figure 5:
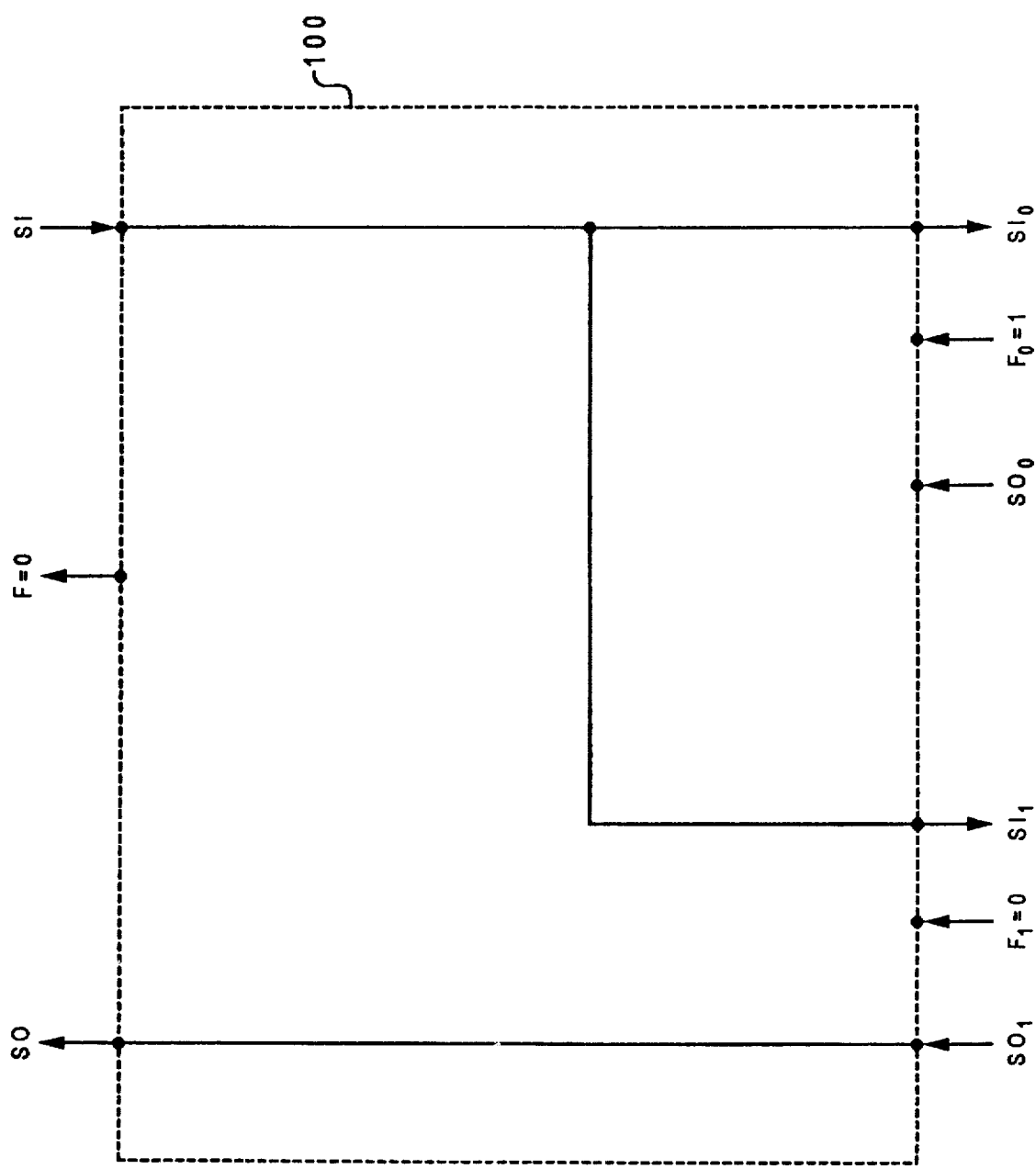

The second configuration of FIG. 3 will produce a connection of ports in node 100 as diagramed in FIG. 5. In the second configuration, Node0 (the node connected to the right branch of node 100 and not shown) is not transmitting (i.e., it is forwarding) a coherence message to its next higher level node, in this case node 100. Therefore, node0 has asserted its forward signal $F_0$. The other node connected to node 100, node, is transmitting a message to the next higher node, node 100, and thus has negated its forward signal $F_1$. With $F_1=0$, AND3 outputs F=0. The asserted $F_0$ allows SI to transmit through AND1 into OR1. Because, by definition with $F_0$ asserted, $SO_0$ is not outputting any messages, only the output of AND1 is output at port $SI_1$. Again, with $F_1=0$, AND2 is closed and $SO_1$ passes through OR2 to SO.

Figure 6:
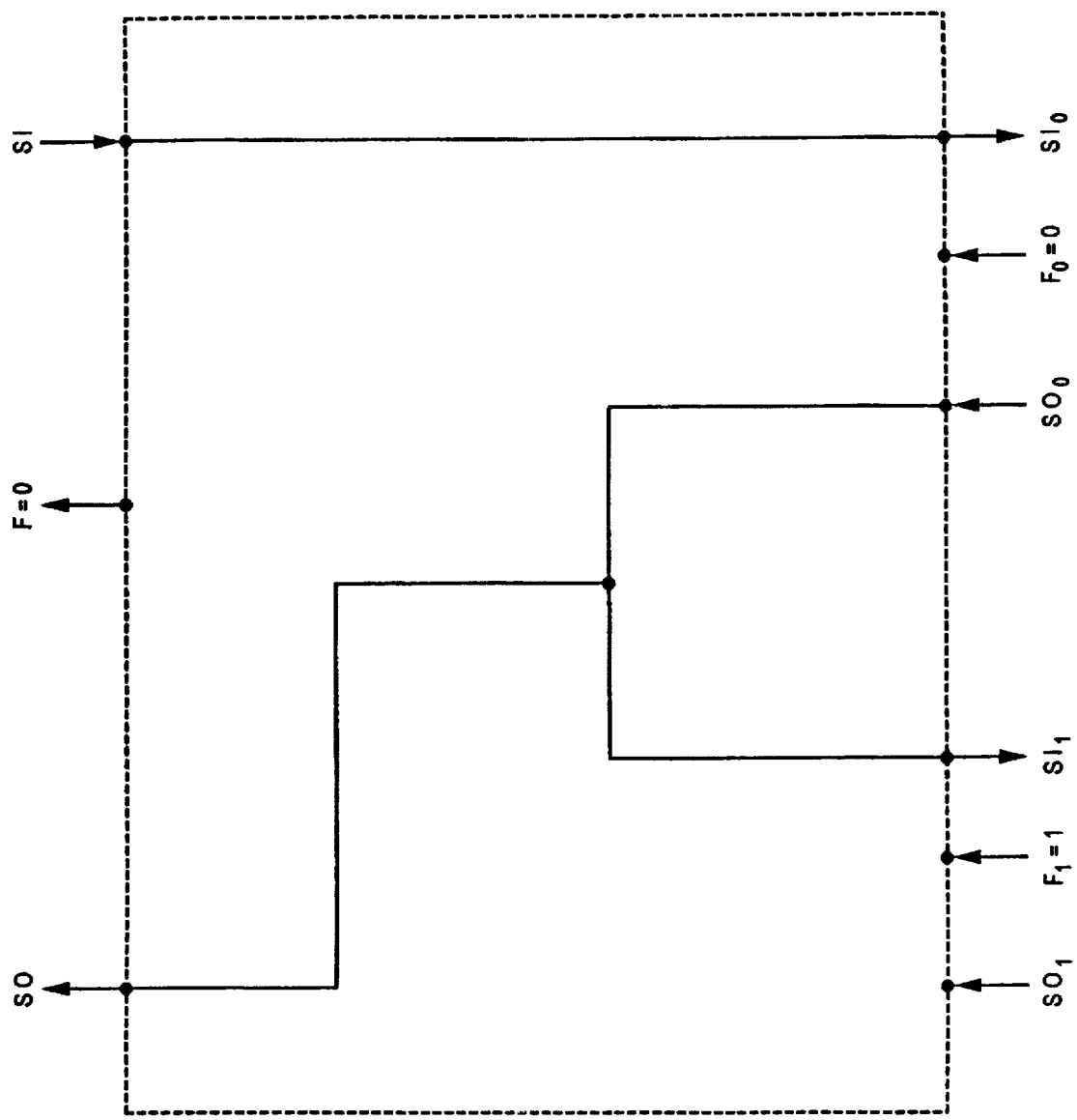

Referring now to FIG. 6, there is diagramed a third configuration of the logic circuit of FIG. 3. In this situation node0 is transmitting a message over the network and node1 is not: $F_0=0$ and $F_1=1$. $F_0$ closes AND3 to produce F=0. Once again SI is directly connected to $SI_0$. Because $F_0$ is negated, it is transmitting messages over $SO_0$, which is directly connected to $SI_1$ through OR1. The negated $F_0$ closes AND1 as an input into OR1. The asserted $F_1$ allows $SO_0$ to pass through AND2 into OR2. By definition, an asserted $F_1$ indicates that no messages are output on $SO_1$, and therefore, the output of AND2 passes through OR2 to SO.

Figure 7:
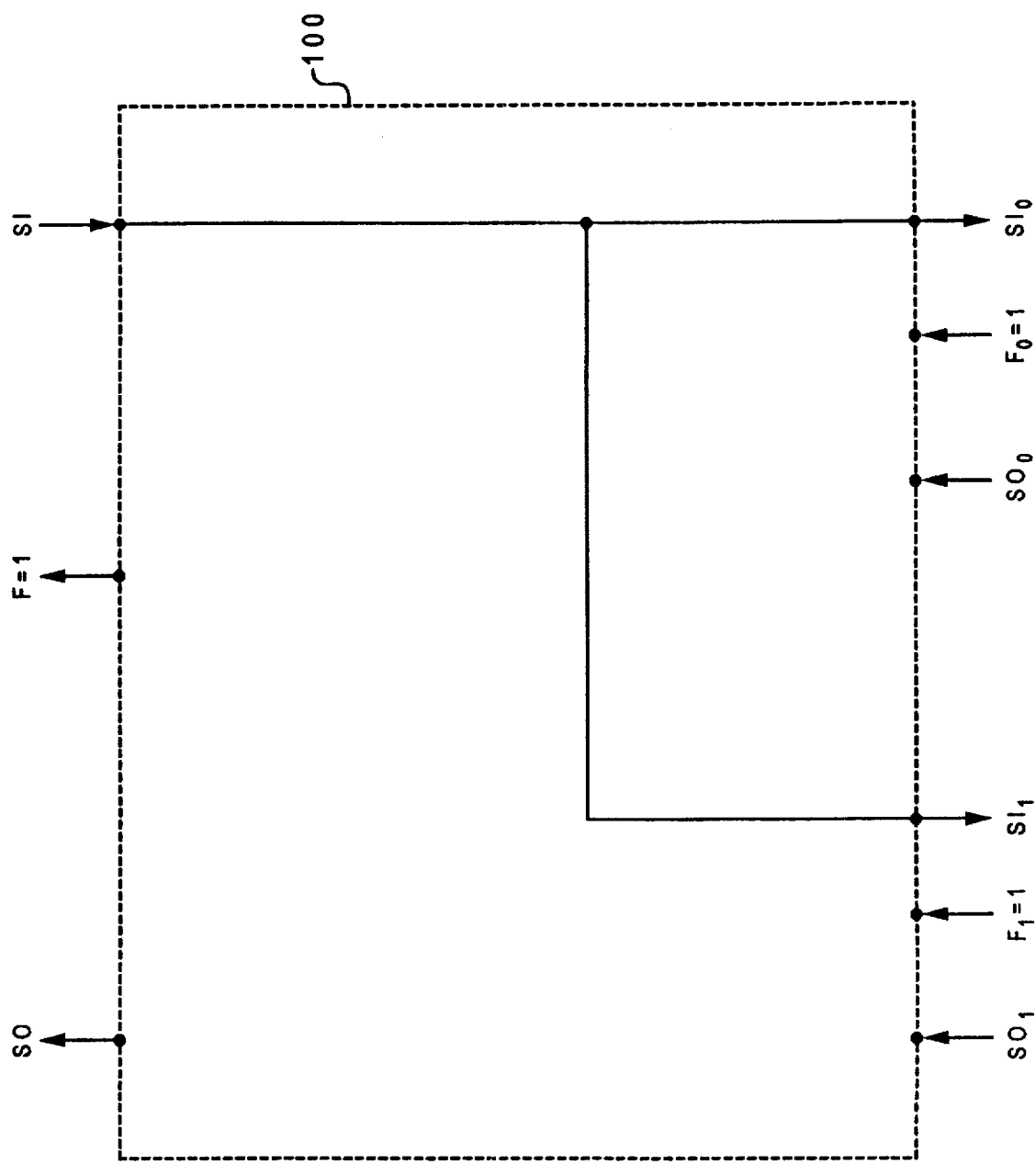

The fourth possible configuration of the logic circuit of FIG. 3 occurs when neither of the lower level nodes are transmitting messages to node 100. A diagram of the transmission connections for this configuration is shown in FIG. 7. Here, $F_0=F_1=1$. These inputs generate F=1 from AND3. SI is directly connected to $SI_0$. $F_0$ is asserted, allowing SI to pass through AND1 and OR1 to $SI_1$. Node0 is not transmitting, so $SO_0$ does not pass through OR1 to $SO_1$. Although $SO_1$ is connected through OR2 to SO, and $SO_0$ is connected through AND2 and OR2 to SO, those connections are not shown to simplify the diagram of FIG. 7 since neither node is transmitting any messages over their snoop-out port.

Referring again back to FIG. 2, root node NODE1 is the top level node of the binary logic tree. The SO of NODE1 is directly connected to the SI of NODE1. The two branches of the binary logic tree extending down from the root node to the next level nodes NODE2, NODE3 are comprised of three busses for delivering signals. As can be seen from FIG. 2, the connections of NODE1 to NODE2 are equivalent to the connections from node 100 to node0, as described with FIG. 3, and the connections of NODE1 to NODE3 are equivalent to the connections of node 100 to node1, as described with FIG. 3.

From each node NODE2, NODE3, the binary tree again branches into two connections to the lower level nodes from each node NODE2, and NODE3. Each of the higher level connections from NODE4–NODE7 are connected to their associated next higher level node's lower level connections. The branch nodes NODE4–NODE7 in turn have two branch connections to the next lower level nodes, in this case, those nodes being the processors/caches P0–P7. Each processor P0–P7 having its SO, F, and SI connected to the lower level connections of the next higher level node (i.e. NODE4–NODE7).

Figure 8:
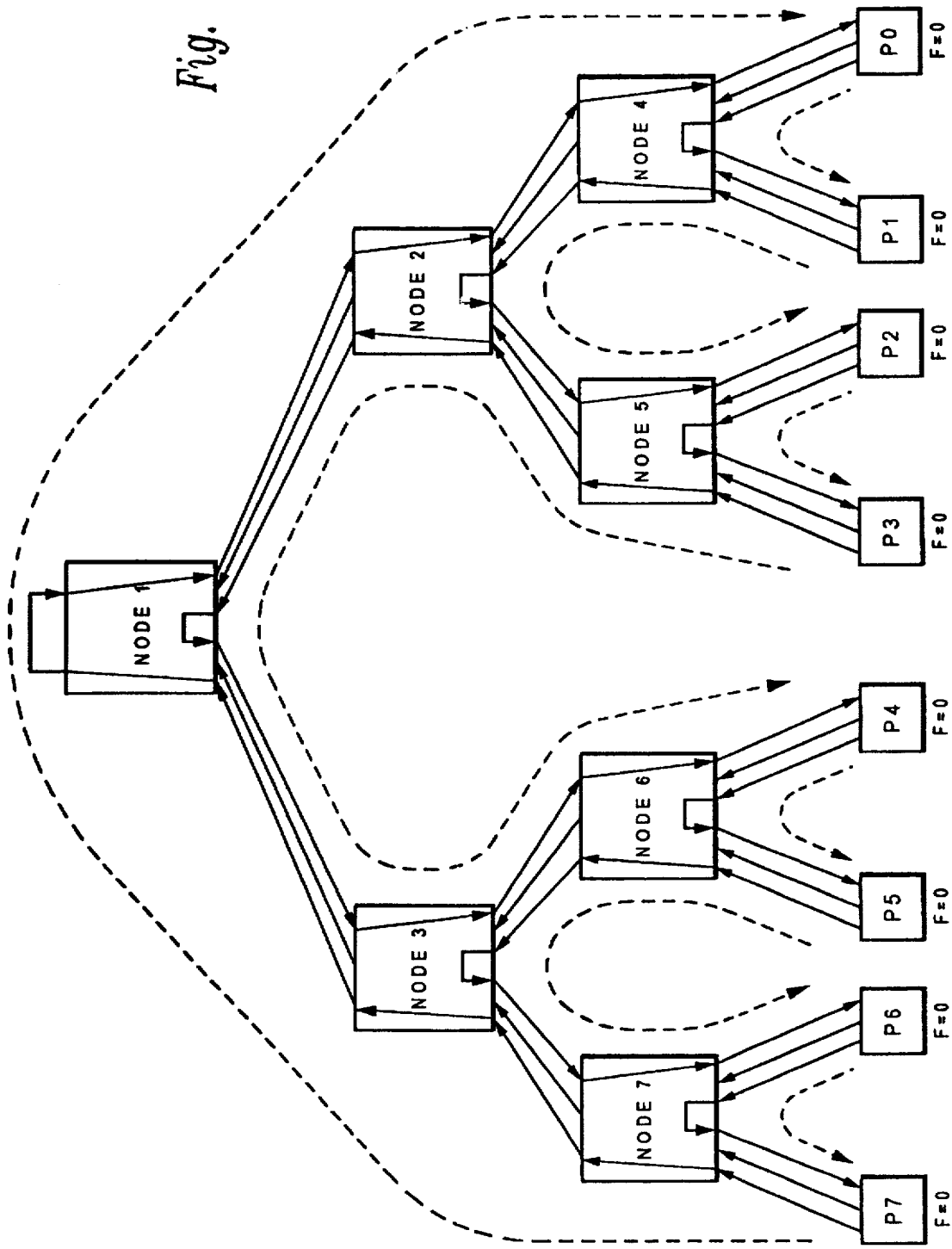
FIG. 8 shows the connections and message transmission flow during a cycle of the cache coherence network of the present invention, under conditions of a first example.
Figure 9:
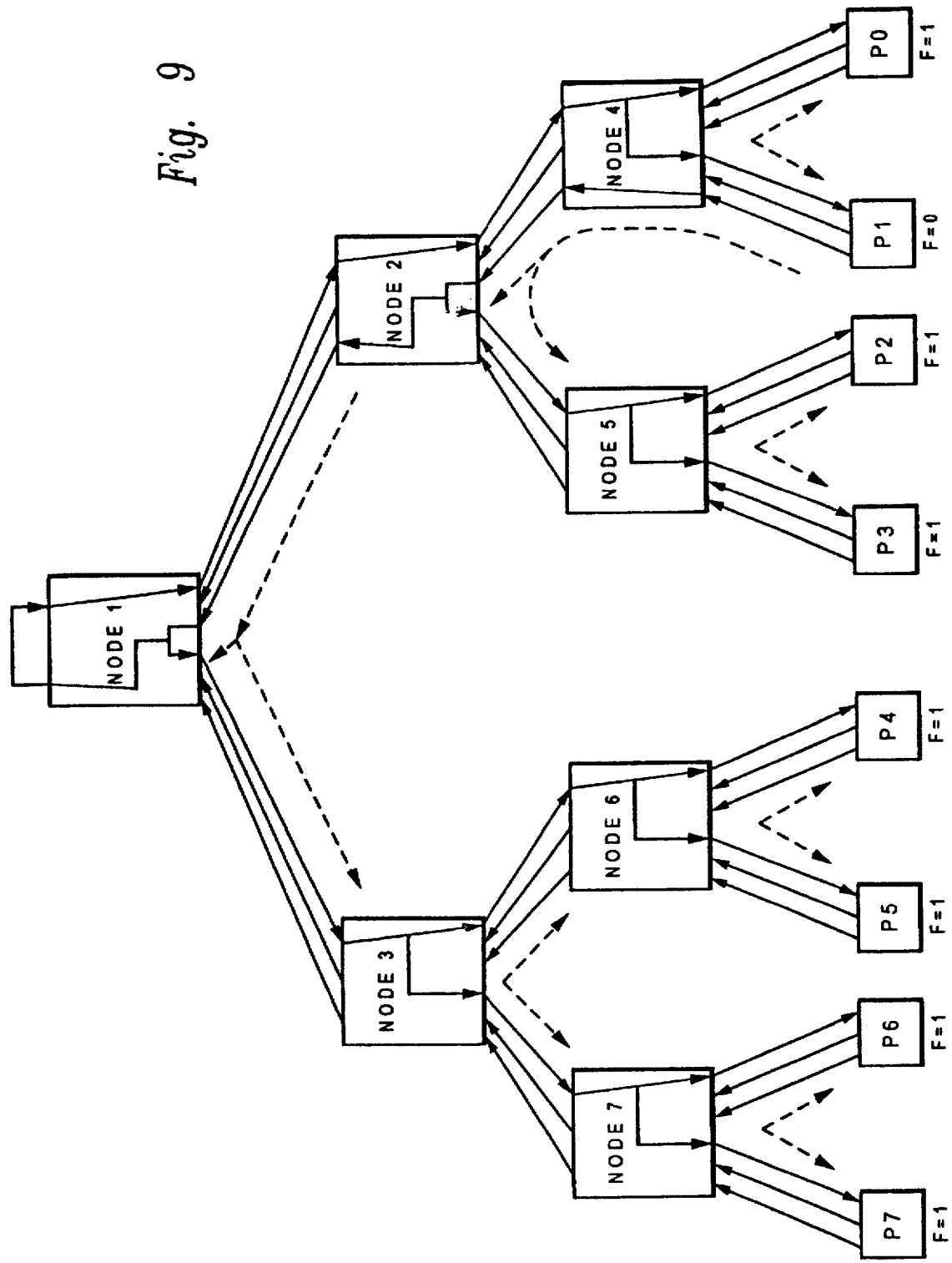
FIG. 9 shows the connections and message transmission flow during a cycle of the cache coherence network of the present invention, under conditions of a second example.
Figure 10:
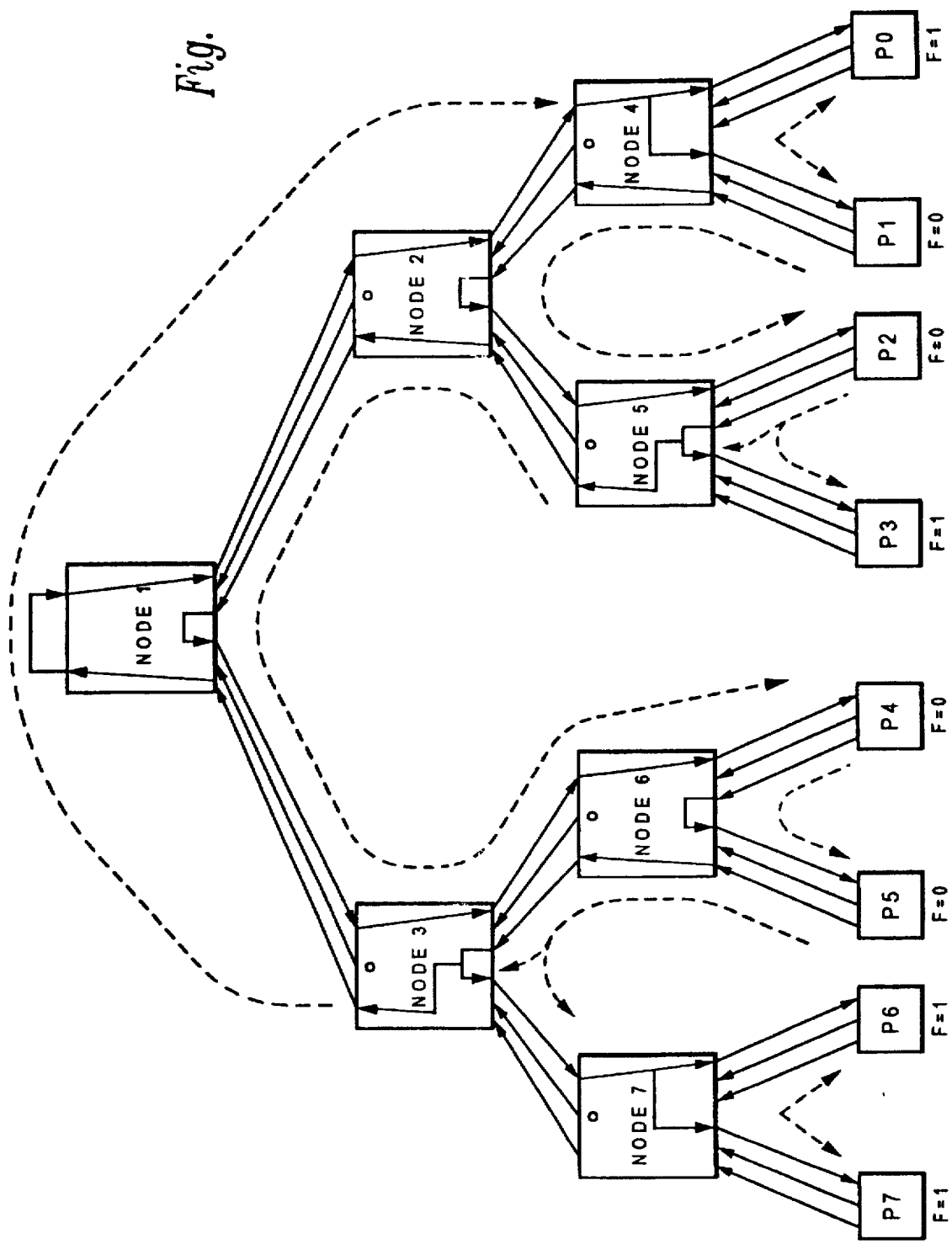
FIG. 10 shows the connections and message transmission flow during a cycle of the cache coherence network of the present invention, under conditions of a third example.

For three examples of how the cache coherence network of the present invention adapts to coherence traffic on the network, consider FIGS. 8–10. For the first example, consider the extreme case where every cache on the network is attempting to transmit a coherence message onto the network. In this extreme case, every cache must receive every other cache's message and potentially might respond with another message for each received message. Such a scenario forces the cache coherence network into a ring-type network where each cache passes a received message on to the next cache in the network after determining any response of its own to the message.

In the example of FIG. 8, it can be seen that all caches are negating their forwarding signals (F=0), so that they may transmit a coherence message out onto the network. Consequently, NODE4–7 will have negated forward inputs from the lower level nodes. Thus, the logic circuit of each node will create transmission connections equal to those shown in FIG. 4, as shown in FIG. 8. As can be seen from FIG. 4, NODE4–7 will also negate their forward signals, resulting in NODE2 and NODE3 being configured as FIG. 4. Last, NODE1 also has two negated forward signal inputs, configuring NODE1 as FIG. 4.

The dashed arrows shown in FIG. 8 indicate data flow within the network. As can be seen, with every cache in the network outputting a message on the network during this current cycle, each cache only transmits to the next cache in the network. For example, P0 outputs its coherence message on its snoop-out (SO). This arrives at NODE4 on its SO₀ port, which is connected to its SI₁ port, which delivers P0's coherence message to P1 at its SI port. P1 outputs its message on its SO port which arrives at SO₁ of NODE4. This is transmitted to the SO port of NODE4, and on to the node at the next higher level of the tree. In this case, the next higher node from NODE4 is NODE2. Here, the message arrives on the right branch leading to NODE2. NODE2 is configured to transfer this message back down the left branch to NODE5. In turn, NODE5 connects its SI port to the SI port of the right branch node at the next lower level from NODE5, in this case, that node being P2. It can be seen then, that the coherence message output from P1 is transmitted through NODE4, up to NODE2, back down to NODE5, and then arriving at P2.

By inspecting the transmission paths of the remainder of the processors, it can be seen that each processor passes its coherence message on to only the next processor in the network. Because that next processor is also transmitting a message onto the network, the message from the previous processor is necessarily clipped and is not sent on to any other processors in the system. This can be understood, with reference to FIG. 8, by noticing that data moves in one direction within the network. Because of the particular logic circuit used in the preferred embodiment, data generally travels from the right-hand side of the network to the left-hand side before passing over the top of the tree to transmit to the remainder of the tree on the right-hand side. Thus, in the preferred embodiment, the next processor in the network is the next processor to the left.

In FIG. 8, the network has formed a ring-network. In this network, each processor passes a network message on to the next processor. The caches continue to pass the message along to the next cache in the ring with each cycle of the network until every cache in the network has received the message.

Referring now to FIG. 9, there is depicted a diagram of the data flow for a second example within a preferred embodiment of the cache coherence network of the present invention. In this extreme example, only one processor in the network is attempting to transmit a coherence message over the network during the current cycle. Because no other messages are being sent over the network during the current cycle, the one processor transmitting over the network is able to broadcast its message to every other processor within this one cycle. Here, P1 is transmitting a message, and, therefore, has negated its forward signal. All other caches, having not transmitted a message, have asserted their forward signals. (P2–P7 have F=1). Therefore, NODEs5–7 are configured as shown in FIG. 7. Each of these nodes assert their forward signals. This results in NODE3 being configured as shown in FIG. 7. NODE4 receives a negated forward signal from its left branch and an asserted forward signal from its right branch, coming from the processor nodes P1 and P0, respectively. This places NODE4 in the configuration of FIG. 5. NODE2 receives an asserted forward signal from NODE5 and a negated forward signal from NODE4, configuring it as shown in FIG. 6. Similarly, NODE1 receives an asserted forward signal from NODE3 on its left branch, and a negated forward signal from NODE2 on its right branch, resulting in a configuration as shown in FIG. 6.

Given this structure of the network connections during the current cycle, the dashed arrows in FIG. 9 describe the direction of coherence message transmission from processor P1 to the rest of the processors connected to the cache coherence network. The message output from P1's SO port passes through NODE4 up into NODE2, where the message is transferred both back down the left branch from NODE2 to NODE5, and up through NODE2 and up along the right branch of NODE1. The message wrapping around from P1 through NODE5 is then transferred back down both the left and right branches of NODE5 to processors P2 and P3. The message also is transmitted through SO of node2 along the right branch of NODE1. This message is transferred back down the left branch of NODE1 to be broadcast back down the entire left-hand side of the binary logic tree so that P4–P7 receive the message. The message is also transmitted up through the SO port of NODE1, which wraps back down through the right-hand branch of NODE1 into NODE2, and again down the right-hand branch of NODE2 into NODE4, where the message is passed down both branches of NODE4 into P0 and P1.

As can be seen from the above description of FIG. 9, the cache coherence network of the present invention was able to adapt itself to a broadcast network so that a single processor was able to broadcast the message to the entire network within one cycle of the cache coherence system. The message spreads out along the branches of the tree to all processors to the left of the broadcasting processor that are within the broadcaster's half of the binary logic tree. When the broadcasted message reaches the root node, NODE1, the message is passed back down along the right-hand side of the broadcasting processor's half of the tree so that all processors to the right of the broadcasting processor and its half of the tree receives the message. At the same time, the message is broadcast down from the root node to all processors in the entire other half of the binary logic tree. In the broadcast mode, the broadcasting processor will also receive its own message. It has been explained, the received message will contain an identification field which indicates to the broadcasting cache that the received message was its own, and thus, should be ignored.

Referring now to FIG. 10, there is depicted a third example of the connections and data transmission in a preferred embodiment of the cache coherence network of the present invention during a particular cycle of the network. This example shows how the present invention can adapt to provide a combination of the ring and broadcast networks under conditions between the two extremes described in the examples of FIG. 8 and FIG. 9.

In this example, for the current cycle, processors P1, P2, P4, and P5 are transmitting coherence messages onto the network, as is indicated by their negated forward signals. Processors P0, P3, P6, and P7 are not transmitting onto the network during the current cycle, as is indicated by their asserted forward signals.

A 0-1 forward signal input into NODE4 configures it as FIG. 5. A 1-0 forward signal input into NODE5 configures it as FIG. 6. A 0-0 forward signal input into NODE6 configures it as FIG. 4. A 1-1 forward signal input into NODE7 configures it as FIG. 7. The forward signals from both NODE4 and NODE5 are negated, configuring NODE2 as seen in FIG. 4. The forward signal of NODE6 is negated and the forward signal of NODE7 is asserted, configuring NODE3 as shown in FIG. 6. The forward signals of NODE2 and NODE3 are both negated, configuring NODE1 as seen in FIG. 4.

Processor P1's message will pass through NODE4 up the right branch of NODE2, down the left branch into NODE5, and down the right branch of NODE5 into processor P2. Because processor P2 was also broadcasting a message during this cycle, NODE5 could not be configured to allow both P1 and P2's message to be transferred down the left branch of NODE5 into P3. Thus, P1's message is clipped at P2, and P2 must maintain P1's coherence message in its SI queue to be retransmitted to the rest of the network on the next or a succeeding cycle. Also, P1's message was not transmitted up through S0 of NODE2 because another processor to the left of P1 at a leaf of the NODE2 branch was also transmitting, and, therefore, was given the connection to the snoop-out of NODE2.

As can be seen from FIG. 10, P2's message passed back down the left branch of NODE5 to P3 and up through S0 of NODE5, through to the S0 of NODE2 to NODE1. At NODE1, the message was transmitted back down the left branch of NODE1 to NODE3. The message from P2 passes down the right branch of NODE3 and the right branch of NODE6 into P4. There the message is clipped because of P4's transmission. P4's transmission is also clipped by P5's transmission, and therefore is passed only to NODE6 and then back down to P5.

P5's message passes up through NODE6 and then up along the right branch of NODE3, where it is sent both back down the left branch of NODE3, and up to the next higher level node, NODE1. The message passing down the left branch of NODE3 is broadcast through NODE7 into processors P6 and P7. The message sent through the snoop-out of NODE3 routes back up through NODE1, and down along the right branch of NODE1 and NODE2 into NODE4. At NODE4, the message of P5 is broadcast to both P0 and P1.

When using the network of the present invention, there is a danger that a cache initiating a coherence message might assert its forward signal during a cycle that one of its own messages currently pending on the network is delivered back to it. The problem arises in that now the message has been passed over to a subsequent processor once again, which will reforward it throughout the network, and that this could continue forever since the initiating cache may continue to assert its forward signal.

To correct for this danger of a continuously forwarded request, additional logic can be added to the network. At the root level node in the network, the path that forwards data from the left half of the tree to the right half of the tree would have a decrementer, and so would the path that goes in the opposite direction. Each coherence request sent out over the network would contain an additional 2-bit value that is decremented every time the message traverses between the two-half trees. An additional bit in the request carries a flag stating that the request is valid or invalid. This flag bit is set to "true" by the initiating cache, while the queue value is set to 2. The flag is turned to invalid when the count is already 0 when the request reaches the root node. All invalid requests received are to be discarded at once by a receiving cache. If a unitary coding of 2 is used, an easy implementation of the decrementers is a mere invertor. The right to left transfer negates one bit of the two bit count value, and the left to right transfer negates the other. The logical OR-ing of the 2-count bits as they come into the root node generates the valid bit.

Another problem is that of detecting whether all caches have responded or deciding that no more caches would respond at a later time to a particular coherence message. This problem arises because of the adaptability of the cache coherence network. As coherence traffic increases, the number of messages clipped increases, which necessarily delays the transmission of requests and responses by additional cycles. This problem is best solved by means of a protocol and time-out mechanism that assumes an upper bound on the delay that each cache may introduce in the path of a message and of the corresponding response, assuming that each is clipped at every cycle, and that adding up these delays will produce an upper bound on the time after which no responses may be expected by any caches in the network.

Although the present invention has been described in a scheme based on a binary tree, the present invention can easily be generalized to any M-ary tree. It has been shown in the literature that a modified binary tree can be imbedded in a hypercube. See, "Scalability Of A Binary Tree On A Hypercube", S. R. Deshpande and R. M. Jenevein, ICPP 1986, incorporated herein by reference. This technique can be applied to achieving snoopy protocol in a hypercube based multiprocessor system.

In summary, the cache coherence network of the present invention automatically adapts to the coherence traffic on the network to provide the most efficient transmission of coherence messages. The network adapts to a broadcast network or a ring network, or any combination in between, as a function of which caches attached to the network are attempting to transmit coherence traffic on the network. Thus, branches of the binary logic tree with light coherence traffic may be predominately configured in a broadcast configuration to allow coherence messages to be quickly delivered to each cache within that branch. Still other branches with heavy coherence traffic will automatically adapt to this increased traffic and configure themselves predominately in a ring network.

While the invention has been particularly shown and described with reference to a preferred embodiment, it will be understood by those skilled in the art that various changes in form and detail may be made therein without departing from the spirit and scope of the invention.

I claim:

1. A cache coherence network for transferring coherence messages between processor caches in a multiprocessor data processing system, the cache coherence network comprising:

a plurality of processor caches that are each associated with a respective one of a plurality of processors, each processor cache having a snoop-in input, a snoop-out output, and a forward output, wherein the snoop-in input receives coherence messages and the snoop-out output transmits, at the most, one coherence message per current cycle of the network timing, wherein a processor cache among said plurality of processor caches asserts a forward signal on the forward output when the cache is not transmitting a coherence message on the snoop-out output and negates the forward signal on the forward output when the cache is transmitting a coherence message during the current cycle, wherein the processor cache generates coherence messages according to a coherency protocol, and, further, wherein the processor cache stores coherence messages received on the snoop-in input and outputs coherence messages on the is snoop-out output, after determining any response coherence message based on the received coherence message;

an M-ary logic tree circuit having a plurality of nodes connected in a tree structure, starting at a top root node and having multiple branches formed of branch nodes positioned at multiple levels of a branch, and each branch node having a snoop-in connection, a snoop-out connection, and a forward connection connected to each of a next higher level node and M lower level nodes, such that a branch node is connected to a higher node at a next higher level of the tree structure, and to M lower nodes at a next lower level of the logic tree circuit, and wherein a forward signal on a forward connection indicates that the associated node is outputting a coherence message on the snoop-out connection to the higher node during the current cycle, and wherein each branch ends with multiple connections to a processor cache among said plurality of processor caches at a processor cache's snoop-in input, snoop-out output, and forward output, wherein the processor cache forms a bottom level node; and wherein said cache coherence network adapts in response to a number of coherence messages being transferred such that said M-ary logic tree circuit routes coherence messages between said plurality of processor caches substantially in a ring-network if the number of coherence messages is relatively high and routes coherence messages between said plurality of processor caches substantially in a broadcast-network if the number of coherence messages is relatively low.

2. The cache coherence network of claim 1, wherein a node transmits a coherence message received on the snoop-in connection from the higher node to the snoop-in connection of a first of said M lower level nodes, transmits a coherence message received on the snoop-out connection of the first lower level node to the snoop-in connection of a second of said M lower level nodes, and transmits a coherence message received on the snoop-out connection of the second lower level node to the snoop-out connection going to the higher level node, when both the first and second lower nodes are transmitting coherence messages during the current cycle.

3. The cache coherence network of claim 1, wherein a node transmits a coherence message received on the snoop-in connection from the higher node to the snoop-in connection of a first of said M lower level nodes, and transmits a coherence message received on the snoop-out connection of the first lower level node to both the snoop-in connection of a second of said M lower level nodes and the snoop-out connection going to the higher level node, when the first lower node is transmitting a coherence message and the second lower node is not transmitting a coherence message during the current cycle.

4. The cache coherence network of claim 1, wherein a node transmits a coherence message received on the snoop-in connection from the higher node to the snoop-in connection of a first of said M lower level nodes and the snoop-in connection of a second of said M lower level nodes, when the first and second lower nodes are not transmitting coherence messages during the current cycle.

5. The cache coherence network of claim 1, wherein a node transmits a coherence message received on the snoop-in connection from the higher node to both the snoop-in connection of a first of said M lower level nodes and the snoop-in connection of a second of said M lower level nodes, and transmits a coherence message received on the snoop-out connection of the second lower level node to the snoop-out connection going to the higher level node, when the first lower node is not transmitting a coherence message and the second lower node is transmitting a coherence message during the current cycle.

6. The cache coherence network of claim 1, wherein the root node has a snoop-out connection and a snoop-in connection, wherein the snoop-out connection of the root node is connected to the snoop-in connection of the root node.

7. The cache coherence network of claim 1, wherein all nodes of the M-ary logic tree circuit are carry look-ahead circuits.

* * * * *